INVENTORS
EUGENE R. MARTIN
DAVID I. MORTON

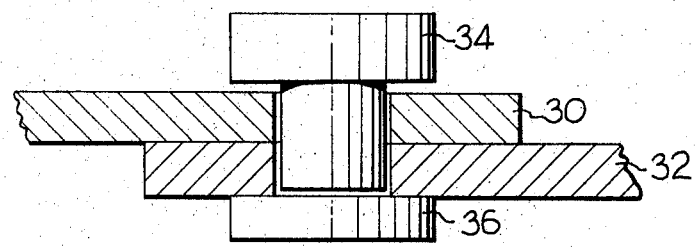
Fig_5_
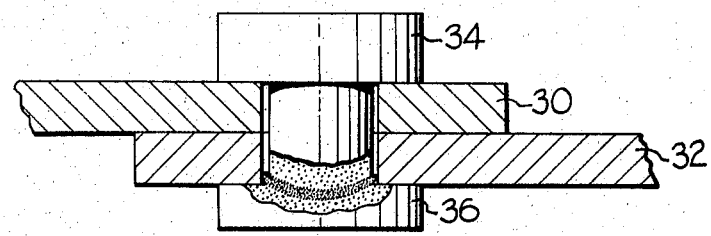
Fig_6_

United States Patent Office 3,477,115
Patented Nov. 11, 1969

3,477,115
METHOD OF FASTENING PARTS BY FRICTION WELDING
Eugene R. Martin, East Peoria, and David I. Morton, Peoria, Ill., assignors to Caterpillar Tractor Co., Peoria, Ill., a corporation of California
Filed Mar. 17, 1967, Ser. No. 623,984
Int. Cl. B23k 27/00
U.S. Cl. 29—470.3                    1 Claim

ABSTRACT OF THE DISCLOSURE

Method of joining or clamping a first part to a second part by passing one end of a rapidly rotating rivet-like member through said first part and into frictional engagement with said second part to produce a friction weld between said rivet-like member and said second part.

BACKGROUND OF THE INVENTION

This invention relates to a method of fastening two or more plates or the like by friction welding with a rivet-like member. More specifically the invention comprises providing a hole in one or more members to be joined, or in certain instances letting the rivet make its own hole, and then friction welding the rivet either to one of the assembly members or to a separate member.

The invention provides a valuable contribution to the art in that the friction welding process may now be used to join parts not presently capable of being welded to each other because of their size, shape, materials, etc. Friction welding dictates that one of the members to be joined, or at least part of one of the members, be of a size and shape that can be conveniently rotated. With the proposal of the present concept, this requirement is eliminated and many things that presently must be riveted, bolted or otherwise fastened together can now be joined by friction welding.

The present invention also provides a solution to the difficult problem presented when it is desired to join dissimilar materials by friction welding. Almost any combination of materials can now be joined by using one of the embodiments set forth in the present invention. Further, in some cases, the invention may be utilized to reduce the cost and time for fabricating an assembly by eliminating the necessity of drilling or punching holes in certain materials.

The fastening method of the present invention is superior to conventional bolts, cap screws, and conventional riveting in that it reduces, and in some cases eliminates, the number of holes to be drilled; eliminates the use of nuts, threads and the like; eliminates the use of washers, lock washers or other locking devices normally required; eliminates preheating of rivets; and, eliminates the necessity of a rivet backup member.

Other and further advantages and objects of the present invention will be apparent from the following description and claim and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used, and structural changes may be made as desired by those skilled in the art without departing from the present invention and the purview of the appended claim.

BRIEF DESCRIPTION OF THE DRAWING

FIGS. 5 and 6 are side elevations, partially in section, illustrating yet another embodiment for practicing the method of the present invention.

DESCRIPTION OF THE PREFERRED EMBODIMENTS

Figure 1:
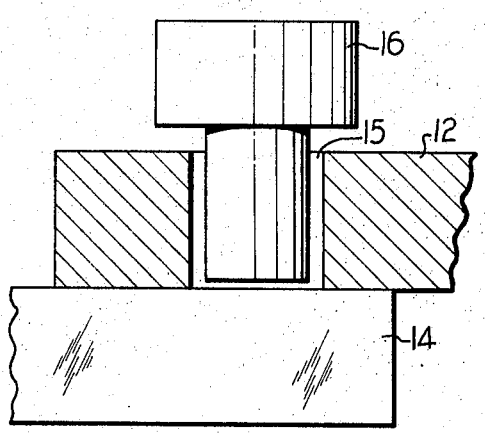
FIGS. 1 and 2 are side elevations, partially in section, illustrating one embodiment for practicing the method of the present invention.
Figure 2:
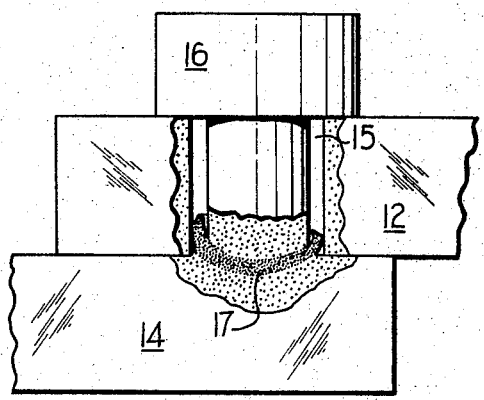

FIG. 1 illustrates two plate members 12 and 14 prior to being jointed by the rivet-like fastening member 16 which is shown inserted through a hole 15 formed in member 12. During the joining process, the fastening member 16 is rapidly rotated and brought into contact under pressure with the plate 14. As the plate 14 is heated by frictional rubbing contact with the fastening member 16 welding heat is generated as indicated by the heat affected zone 17 shown in FIG. 2. In FIG. 2 the three members are shown as they look after member 16 has been friction welded to the plate 14 thereby joining the three members 12, 14 and 16 into a single unit. It is desirable that the length of the fastening member 16 be such that as it is welded to plate 14 and material is flashed from the weld zone, the head of member 16 comes into contact with the surface of plate 12 as the weld is completed. The method results in the plates 12 and 14 being snugly joined together by member 16 and only requires that a hole for member 16 be provided in plate 12 since the plate 14 is of a material which is weldable to the member 16.

Figure 3:
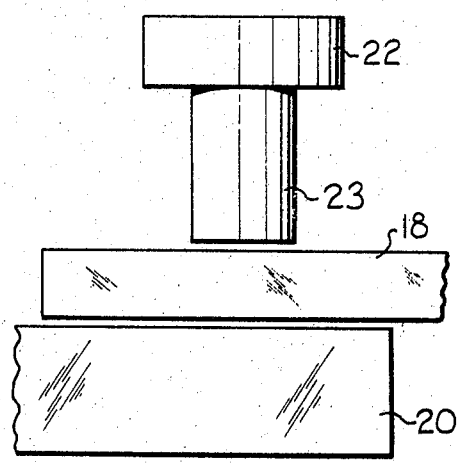
FIGS. 3 and 4 are similar views illustrating a second embodiment for practicing the method of the present invention.
Figure 4:
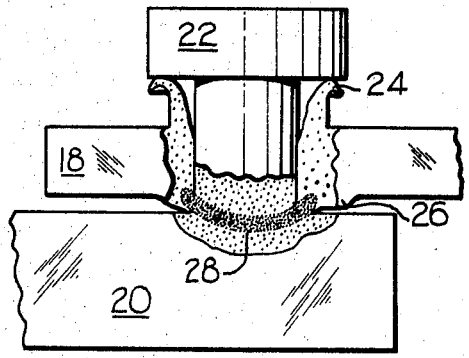

FIGS. 3 and 4 illustrate a modified embodiment for practicing the method of the present invention. In this embodiment a pair of plates 18 and 20 are to be joined wherein the upper plate 18 is of a material which is softer or more flowable at high temperature than a rivet-like fastening member 22. During the joining process, the fastening member 22 is rotated and brought into contact under pressure with plate 18. As plate 18 is heated by frictional rubbing contact with member 22, the more flowable material of the plate 18 is extruded or flashed as indicated at 24 and 26 in FIG. 4 such that a hole is formed in plate 18 and member 22 comes into frictional contact with the lower plate 20 thereby generating welding heat as indicated by the heat affected zone 28. When rotation of member 22 is stopped, a weld is formed such that the member 22 is joined to plate 20. It will be observed that this method of fastening is very advantageous over conventional methods in that it eliminates the need to punch or drill holes in either of the plates 18 or 20. It is preferable when practicing the embodiment shown in FIGS. 3 and 4 that the member 22 be somewhat longer than the thickness of plate 18 to allow for some extrusion of material between the head of member 22 and the plate 18. It has also been found advantageous to prepare the surface of the tip 23 of member 22 with crossed V-notches or by chamfering, etc., in order that the member 22 may more readily machine its own hole in member 18. In order to practice this particular embodiment of the present method, member 18 should be of some type of soft material, such as mild steel, aluminum, copper, plastic, etc., and member 22 should be a stronger material which is weldable to the material of plate 20.

FIGS. 5 and 6 show yet another embodiment of the fastening process of the present invention. As shown, the plates 30 and 32 are each provided with a hole to accommodate the fastening member 34 which is passed therethrough and welded to a member 36 thereby joining all the pieces into a single unit. The process is very versatile since plates 30 and 32 can be of most any material or combination thereof (metals, glass, fiber glass, ceramics, wood, rubber, etc.).

The basic requirement for practicing this embodiment of the invention is that the fastening member 34 and base member 36 be of materials which are weldable by friction and have sufficient strength to fill the requirements of the particular application. It should be apparent that the embodiment is not limited to joining only two members such as 30 and 32 but could be used to join almost any number of similar or dissimilar materials as long as the riveting member 34 can pass through them and weld to member 36.

We claim:
1. Method of joining a first metal part to a second metal part by means of a metal, rivet-like member which is weldable to said second part and wherein said first part is of a material which is softer or more flowable at high temperature than said rivet-like member, said method comprising placing the parts in overlapping adjacent relation; rapidly rotating the rivet-like member; applying axial pressure to the rapidly rotating rivet-like member to cause said rivet-like member to pierce the first part and enter into frictional engagement with the second part; and continuing to rotate said rivet-like member until sufficient frictional heat is generated to form a metallurgical bond between said rivet-like member and the second part without piercing the second part.

References Cited
UNITED STATES PATENTS

| | | | |
|---|---|---|---|
| 2,795,039 | 6/1957 | Hutchins | 29—470.3 |
| 2,942,748 | 6/1960 | Anderson | 29—470.3 |
| 3,111,045 | 11/1963 | Iwaki et al. | 29—526 |
| 3,144,710 | 8/1964 | Hollander et al. | 29—470.3 |
| 3,184,353 | 5/1965 | Balamuth et al. | 29—470.3 |

FOREIGN PATENTS 572,789  10/1945  Great Britain.

JOHN F. CAMPBELL, Primary Examiner

U.S. Cl. X.R.

29—432, 471.1